United States Patent Office 3,275,888
Patented Sept. 27, 1966

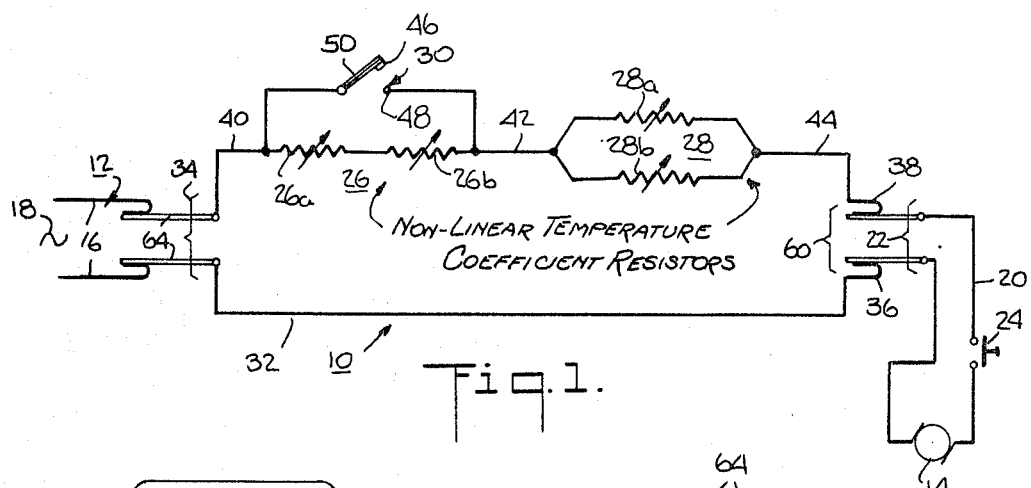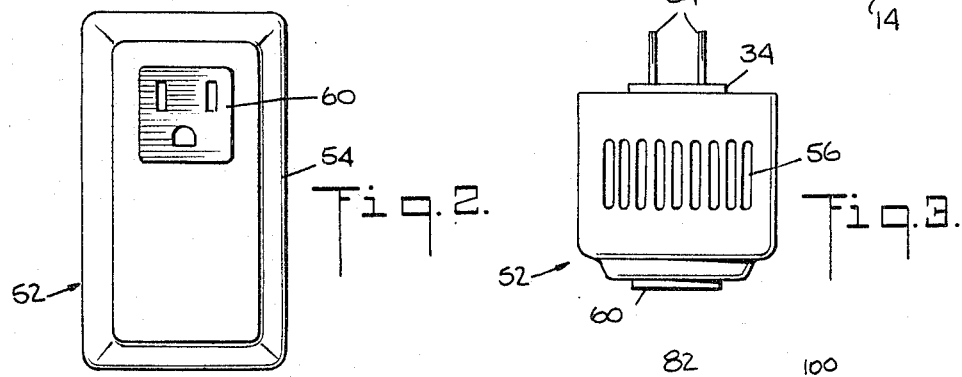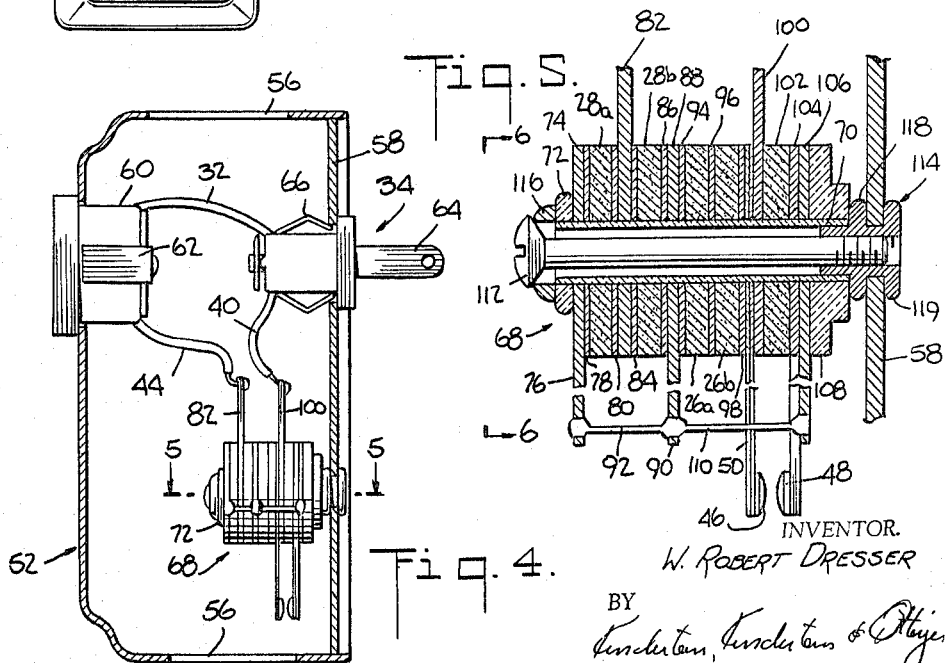

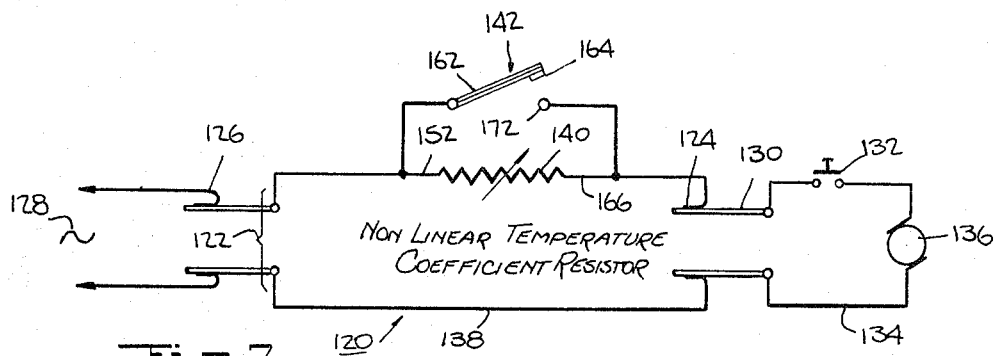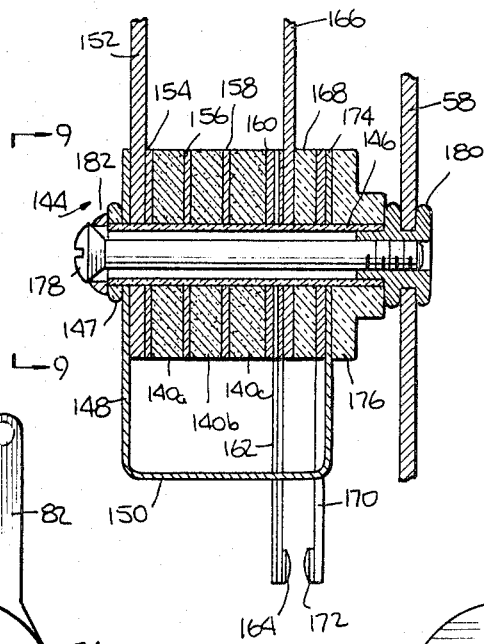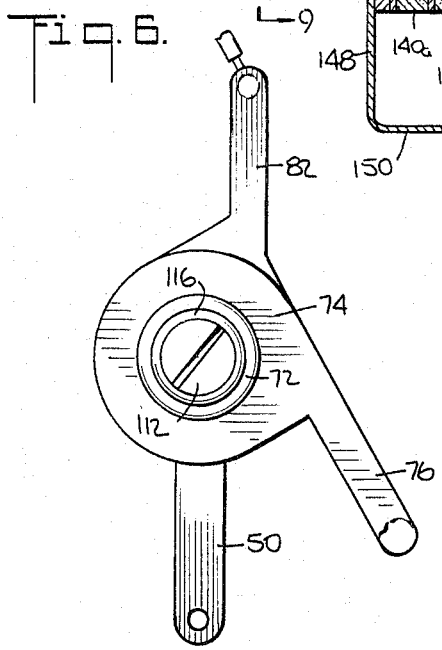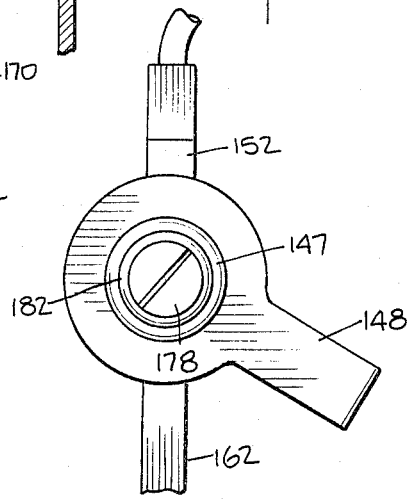

3,275,888
POWER LINE PROTECTING SURGE CURRENT LIMITER FOR SINGLE-PHASE ELECTRIC MOTORS
W. Robert Dresser, Trumbull, Conn., assignor to Barlow Controls, Inc., Stamford, Conn., a corporation of New York
Filed Sept. 12, 1963, Ser. No. 308,553
11 Claims. (Cl. 317—13)

This invention relates to a power line protecting surge current limiter for single-phase electric motors. Although the invention is specially adapted for use with electric motors that drive compressors for domestic air conditioners, the invention is useful in conjunction with a single-phase electric motor that is coupled to a utilization mechanism of any kind. For example, the invention is useful for the operation of single-phase electric motors that run milking machines, household appliances and power operated hand tools. In general, a surge limiter of the present invention is characterized by the fact that it is used in a series circuit connection in one leg of a two wire power feed to a single-phase motor that drives a utilization mechanism the mechanical output of which at full load requires an electric infeed current that is of significant value, being sufficiently high so that it either approaches the current rating of a power line, or in conjunction with other electric equipment on the same line approaches the current capacity of the line.

Singe-phase electric motors at starting draw a line current which is greatly in excess of the current consumed by the motor when it is up to speed. This initial current which is commonly referred to as a "surge current" will overload the current capacity of the line if the single-phase motor, after it has started, operates near such capacity. For example, a domestic air conditioner rated at 12 amperes when running may draw a surge current in the neighborhood of 50 amperes during the brief span required to start it. Once the motor is started the counter E.M.F. generated therein raises the resistance of the motor windings and reduces the current drawn from the line, and even after the load comes on to the motor will not draw an excessive amount of current beyond that which the power line is capable of furnishing, providing, of course, that a properly rated power line is used.

The foregoing problem, i.e. of overloading the line during starting, is aggravated in the case of domestic air conditioners which of late have come to be automatically operated by thermostatic controls. At frequent periods during the day an air conditioner motor is stopped and started. At each start an initial surge current inrush takes place which taxes the power line and which heretofore has caused fuses to be blown or circuit breakers to trip if the air conditioner normal load current rating was a substantial percentage of the current rating of the line. Due to this problem manufacturers have been forced to make domestic air conditioners with comparatively low current ratings and therefore with rather low B.t.u. outputs. Even with these low capacity units difficulty still is experienced in many areas that have not been newly wired. In a great many cities old existing wiring is limited to 15 amperes which is exceeded several times by the initial surge current of even the smallest widely sold domestic air conditioners.

It would be extremely desirable if a power line protecting surge limiter could be provided which would enable domestic air conditioners of small B.t.u. capacity to be serviced by existing power lines of low, e.g. 15 ampere, current capacity and it would be even more desirable to enable such low rated power lines to use larger domestic air conditioners. Various suggestions have been made to solve this problem, but none of these has satisfied commercial demands.

For instance, it has been proposed to employ slow-acting safety devices, such as slow trip circuit breakers and delayed action fuses, for single-phase motors. But this practice is disapproved by building owners and electrical inspectors because it permits the current rating of the line to be exceeded for several seconds and thus creates a dangerous condition.

Some people have fallen back on the expedient, where the motor is connected to a power line that services other electric equipment, of disconnecting the other electric equipment each time that there is connected to the line a single-phase motor which would cause the line to draw more than its rated current. Obviously, this is a very inconvenient method and is of no use at all where the single-phase motor is cut in and out automatically as with a thermostat.

Other people have adopted the procedure of running a separate high current rated power line to the single-phase motor that draws a high initial surge current. However, this is costly and time consuming.

It also has been proposed to use a time delay relay to control a surge limiting resistor that initially is connected in series with a motor and subsequently is shunted out. Both solenoid actuated switches and thermally actuated switches have been suggested for such purpose. However, this expedient is unsafe because should the switch fail to operate, the surge limiting resistor stays in circuit too long and will overheat and burn out. It creates a fire hazard and is also dangerous to persons who might touch a part which is in heat conductive relationship with the hot resistor.

Another difficulty is experienced with series holding resistors that are used to maintain closed thermally actuated switches of surge current limiters for single-phase motors. This difficulty is particularly encountered with domestic air conditions when they are started with the motor under a high output load condition that exists, for example, where the back pressure on the compressor still is present (has not had time to bleed off) so that the motor must start against this pressure. Actually, the motors of domestic air conditioners are not sufficiently strong to start turning under such a back pressure and the motors will stall, so that, in effect the motor is being started under a blocked rotor condition which means that the high initial surge current will persist and will not be gradually reduced. It is conventional to provide thermal safety switches on the motor itself which will cut the motor out and prevent the motor from being damaged under blocked rotor conditions. However, these safety devices are not quick acting and in the period of time that it takes them to cut the motor out the series holding resistor can be burned out, or raised to a dangerously high temperature, and the line protective device, e.g. a fuse, may be actuated. It is true that a domestic air conditioner should not be operated so as to encounter a blocked rotor condition and, indeed, owners are instructed not to turn a domestic air conditioner on until a suitable period of time, say, 2 to 5 minutes, after it has been turned off so that the back pressure can dissipate. Furthermore, the circuitry of a domestic air conditioner includes guards which prevent the motor from being turned on too soon after it has been turned off when it is being operated thermostatically. Nevertheless, the public is not skilled in an engineering sense and almost can be relied upon to operate the air conditioner so as to circumvent the guards. For example, a householder may turn the thermostat to a lower temperature immediately after the compressor is shut down. Thereupon, unless the air conditioner has a thermal time delay, the motor will be forced to start up the compressor under full back pressure with the consequence pointed out above.

Still another difficulty with the proposal to employ a current limiting resistor in series with the motor, which resistor is shunted out by a switch after the motor has started, is that during the starting period that the resistor is connected in series the voltage applied to the motor is reduced. This is excellent for the very first fraction of a second and the resistor must be sufficiently large to prevent tripping of the circuit breaker or blowing of the fuse at this time when the current drawn is very high. However, the same resistor remains in series for the balance of the starting period during which time the torque output of the motor is substantially reduced thereby, so that the motor characteristics are undesirably impaired. Also since the motor is being run at under voltage it tends to overheat.

It is an object of the present invention to provide a power line protecting surge limiter for a single-phase motor in which all of the above various disadvantages are overcome, that is to say, to provide a power line protecting surge limiter which will not be susceptible to burning out, which will not substantially reduce the voltage applied to the motor throughout the entire starting period, which will not be harmfully affected by a blocked rotor condition, and which will operate at a moderate temperature that is not so hot as to raise the danger of burning anyone who might touch physical components in heat conductive relationship with the surge limiting resistor.

It is another object of the invention to provide a power line protective surge current limiter of the character described which constitutes relatively few and simple parts, which is inexpensive to make and which can be assembled rapidly and easily by comparatively unskilled labor, so that the limiter can be marketed at a low cost.

It is another object of the invention to provide a power line protecting surge current limiter of the character described which is particularly compact and which is easy to insulate, so that it can readily be made to satisfy all underwriters' requirements.

It is another object of the invention to provide a power line protecting surge current limiter of the character described which will enable domestic air conditioning units to be started on available house wiring lines which are loaded to near the capacity of their protective equipment.

It is another object of the invention to provide a power line protective surge current limiter of the character described which will obtain a maximum possible starting torque for a motor with a minimum starting current demand.

It is another object of the invention to provide a power line protective surge current limiter of the character described which is rugged and reliable so that it can be exposed to adverse ambient conditions with absolute confidence that it will operate successfully for the life of the utilization mechanism to which it is attached.

It is another object of the invention to provide a power line protective surge current limiter of the character described which will furnish a slower starting cycle for the motor through the limiting of inrush current.

It is another object of the invention to provide a power line protecting surge current limiter of the character described which by the use of a thermally actuated switch assures a more positive operation inasmuch as failure of the switch to close due to intrusion of dust or dirt or to the carbonizing of contacts merely increases the heat available to the switch, thus overriding minor contact disturbances.

Other objects of the invention in part will be obvious and in part will be pointed out hereinafter.

The invention accordingly consists in the features of construction, combinations of elements and arrangements of parts which will be exemplified in the device hereinafter described and of which the scope of application will be indicated in the appended claims.

In the accompanying drawings, in which are shown various possible embodiments of the invention, FIG. 1 is an electric diagram for a power line protecting surge current limiter constructed in accordance with the present invention;

FIG. 2 is a front view of a unit consituting one physical embodiment of said limiter;

FIG. 3 is a top view of the unit;

FIG. 4 is a front-to-back vertical central sectional view through said unit;

FIG. 5 is an enlarged fragmentary sectional view taken substantially along the line 5—5 of FIG. 4, and illustrating the assembly constituting the non-linear temperature coefficient resistors and the thermally actuated shunting switch;

FIG. 6 is an end view of said assembly, the same being taken substantially along the line 6—6 of FIG. 5;

FIG. 7 is a diagram similar to that shown in FIG. 1 of a power line protective surge current limiter embodying a modified form of the invention;

FIG. 8 is a sectional view of the assembly of non-linear temperature coefficient resistors and shunting switch employed in the FIG. 7 embodiment of the invention; and FIG. 9 is an end view of the assembly of FIG. 8, the same being taken substantially along the line 9—9 of FIG. 8.

In general the several objects of the within invention are achieved by utilizing as the power line protecting surge current limiting resistor a non-linear rather than a linear resistor. An ordinary, i.e., linear, resistor used for power line protection has a positive small temperature coefficient of resistance which causes the resistor to increase the value of its resistance as its temperature rises. Accordingly, a linear surge limiting resistor in series with a motor will maintain an almost fixed voltage drop which slightly increases as a function of time (due to temperature rise) and which, therefore, provides, in effect, a substantial stepped voltage change, that is to say, an abrupt appreciable drop of voltage, after a short fixed period of time which should have sufficed to start the motor.

Pursuant to the present invention, by employing a non-linear current limiting resistor having a negative temperature coefficient the voltage drop across the resistor lowers as a function of time because the internal heat generated in the resistor, as the voltage drops therethrough, raises the temperature of the resistor, thereby lowering its resistance which at room temperature is large enough to limit current flow to at least approximately the rated current capacity of the power line. A non-lienar resistor is employed having a comparatively high negative temperature coefficient of resistance, a typical resistor being one in which a temperature increase of about 100° C. over room temperature (about 25° C.) will lower the resistance value to approximately one-tenth of its value at room temperature. Because of this decreasing value of resistance the voltage applied to the motor increases during the starting period, whereby the torque supplied by the motor will rise during this period. In addition, the transistion from the voltage applied to the motor during the starting period, and particularly the voltage thus applied at the end of the starting period, to the voltage applied during the running period will be of a comparatively slight order of magnitude compared to that prevailing when a linear resistor is employed. For all these reasons considerably improved starting characteristics for the motor are achieved. As a practical matter the use of a non-linear resistor will provide the motor with almost 90% of its full load rated current in approximately one and one-half seconds after starting and while the resistor is still operationally series connected with the motor.

Throughout the entire starting period the non-linear negative temperature coefficient resistor provides a nice balance of factors to protect the power line. At the very beginning of the starting period when the motor resistance is lowest the resistance of the current limiting resistor at room temperature is at its maximum for operational purposes this being, as indicated, sufficiently large to limit the current flow to at least approximately the rated current capacity of the power line. Then, as soon as the current starts to flow and the motor begins to turn the resistance value of the surge limiting resistor decreases while at the same time the resistance of the motor increases, so that these two changing values of resistance vary in opposite directions and tend to offset one another. Thus, the power line is effectively protected to substantially the same degree throughout the entire starting period and until the surge limiting resistor is cut out (no longer operationally series connected).

It will be observed, nevertheless, that the reduction of voltage drop effected by the current limiting resistor during the starting period rapidly enhances the torque characteristics of the motor at this critical time.

The use of a non-linear resistor with a negative temperature coefficient has several other advantages in a power line protecting surge current limiter. One of these advantages accrues with respect to the thermally actuated switch employed to shunt the current limiting resistor at the end of a starting period. A typical thermally actuated switch includes a bimetallic (heat sensitive) element in heat conductive relationship with the aforesaid resistor. By having a resistor of high resistance value at the beginning of a starting period a quick pulse of heat will be generated which immediately starts to act on the bimetallic element, so that it is prepared for the subsequent steady flow of heat that will reach it later in the starting period and ultimately (in 1½ to 2 seconds) will close the shunting contacts of the switch.

Another advantage is the additional protection the resistor provides when the motor is started under a blocked rotor condition. When this occurs, a high current (equal to a starting current) will continue to flow through the motor because the rotor is stationary. The motor itself is protected by its own thermal switch but no protection is afforded for the resistor or for the power line. Where an ordinary linear resistor is employed this high flow of current that continues until the motor protective switch shuts off often is enough to burn out the current limiting resistor or to so overheat the same so that it is seriously deteriorated. This will not occur where a resistor embodying the present invention is employed because as the temperature of the resistor goes up, its resistance goes down so that heat equilibrium is quickly reached at a non-destructive temperature. Said resistor therefore is capable of operating without harm to itself for a period of time sufficient to enable the motor thermal cut out switch to function. Additionally, during this blocked rotor futile starting period the non-linear resistor will maintain a finite value of resistance, so that line current is not permitted to flow unimpeded into the motor. Thus, the resistor still functions, although to a more limited extent, as a current limiting resistor to protect the power line until it is cut out of the line by the thermally actuated shunting switch.

In one embodiment of my invention in which a series holding non-linear resistor is employed such resistor remains in the line even after the surge current limiting resistor has been cut out, whereby the residual resistance value of the holding resistor continues to function to an effective degree to limit the current flowing into the blocked motor and through the power line.

It thus will be appreciated that through the use of this special type of resistor as a power line protecting surge current resistor several distinct advantages are gained, to wit, improved starting characteristics for the motor, a smaller voltage transition from starting to running conditions, a more even and less high peak current demand on the power line during starting, a shorter period of time during which the motor is operated at a voltage low enough to overheat its windings, a self-protection for the resistor against burn-out when the motor is started under blocked rotor conditions, and a residual protection for the power line when the motor is started under blocked rotor conditions.

Referring now in detail to the drawings, and more particularly to FIGS. 1–6, the reference numeral 10 denotes a power line protecting surge current limiter constructed in accordance with the present invention. The limiter 10 is intended to protect the power line connected to an existing outlet 12 during the starting of an electric motor 14 coupled to a utilization mechanism, such, for instance, as an air conditioner. The outlet 12 is of any type, e.g., a twin contact female wall receptacle, including a pair of contact blades 16 which are connected to a source 18 of A.C. power.

The motor 14 is a single-phase motor and may be of any standard type. One conventional motor for this purpose which very frequently is employed in air conditioners is a split-phase capacitor motor. However, it is to be understood that the invention is not to be limited to the use of this specific motor since the limiter functions with equal efficacy in the starting of all types of single-phase A.C. motors.

The motor, as is usual, is provided with a two-wire power cord 20 terminating in a pronged plug 22. Two prongs of the plug are connected to the motor windings and the third prong (not shown) is connected to the frame of the motor and the chassis of the utilization mechanism, as is conventional, in order to ground the same. One of the lines running from the plug to the motor windings has a switch 24 series connected therein. This switch can be a manually operated switch, such, for example, as a start-stop switch of an appliance or it may be a thermostatically operated switch, or the switch may be considered as representative of one each of the aforementioned types of switches connected in series. The switch merely has been illustrated to indicate that the appliance motor is provided with its own individual control.

Essentially, the limiter 10 includes a surge current limiting resistor 26 (see FIG. 1) of the non-linear type, that is to say, a surge current limiting resistor having a negative coefficient of resistance, a holding resistor 28 of the same type, and a thermally actuated shunting switch 30 connected in parallel with the current limiting resistor 26. A wire 32 runs directly through the limiter 10 from one prong of a male plug 34 to one female contact blade 36 of a pair of such contacts which is included in the limiter unit.

The other branch of the circuit from the plug 34 to the other female contact 38 (paired with the contact 36) runs in series through the holding resistor 28 and the surge current limiting resistor 26. Specifically, a wire 40 extends from the other prong of the male plug 34 to one terminal of the surge current limiting resistor 26, a wire 42 extends from the other terminal of the surge current limiting resistor 26 to one terminal of the holding resistor 28, and a wire 44 extends from the other terminal of the last-named resistor to the female contact 38. Due to the presently limited number of types of non-linear resistors commercially available, the holding resistor 28 is sub-divided into two parallel connected resistors 28a and 28b; and for the same reason the surge current limiting resistor is subdivided into two series connected resistors 26a and 26b.

The resistors 26a, 26b, 28a, 28b are of the well known non-linear type having a substantial negative temperature coefficient of resistance. One kind of such non-linear resistor which is widely used on a commercial basis is known as a "Thermistor." As a typical example, the particular current limiting resistors 26a, 26b employed in a commercial embodiment of the present invention are catalog number 3W752, manufactured by The General Electric Company of Edmore, Michigan, and known as "Thermistors." These resistors have an individual resistance value of 4.15 ohms at 25° C. and of 0.415 ohm at about 110° C. The holding resistors 28a and 28b likewise are made by the aforesaid company and have a catalog number 3W754. The holding resistors have an individual value of 3.15 ohms at 25° C. and of 0.315 ohm at about 110° C.

It will be observed that by connecting the two holding resistors 28a, 28b in parallel their joint equivalent resistance is approximately 1.58 ohms which is the effective resistance at 25° C. for the holding resistor 28. By connecting the two current limiting resistors 26a and 26b in series their joint equivalent resistance is 8.30 ohms at 25° C. which is, therefore, the effective resistance value of the current limiting resistor 26 this being large enough to limit current flow to the rated capacity of the power line. These values provide satisfactory results for the protection of ordinary house power lines against surge current, providing, of course, that the capacity of the single-phase motor to be connected to the line does not exceed the capacity of the line.

The thermally actuated shunting switch 30 consists of a pair of normally open contacts 46, 48, the contact 48 being stationary and the contact 46 being movable and, for this purpose, mounted on the free end of a cantilever supported bimetallic strip 50. Said strip is in good heat exchange relationship with both resistors 26, 28 so that when the circuit to these resistors is completed upon closing of the switch 24 the bimetallic strip will, after a short period of time, for example, one and one-half seconds to two seconds, bring the two contacts 46, 48 into engagement to shunt out the current limiting resistor 26. Thereafter, the heat generated by flow of current through the holding resistor 28 will suffice, even at the lower resistance-elevated temperature state of this resistor, to maintain said contacts 46, 48 in engagement, so that until the switch 24 is opened, and the holding resistor 28 thereby allowed to cool, the shunting switch will short circuit the surge current limiting resistor 26.

In FIGS. 2–6 there is illustrated a unit 52 constituting a physical embodiment of the limiter 10, as diagrammatically shown in the electric circuit of FIG. 1. Said unit includes a sheet metal casing 54 having a front wall and a deep flange which assumes the form of top, bottom and side walls. The back of the casing is open. The top and bottom walls of the casing are formed with elongated ventilating slots 56. The back of the casing is closed by a sheet metal rear wall 58 having rearwardly protruding squat side flanges which frictionally engage the rear marginal portions of the inner surfaces of the casing side flanges. The rear wall may be welded to the casing or, if desired, detachably held in place as with screws.

Mounted in an aperture of the front wall of the casing is a conventional female socket 60 of electrically non-conductive material. Said socket includes the pair of female contact blades 36, 38 diagrammatically illustrated in FIG. 1, and also a third female contact blade (not shown) which is connected to ground. Access to these contact blades is had through a pair of elongated parallel slots for the blades 36, 38 and a rounded top slot that passes the grounding prong of the plug for the appliance motor 14. The socket 60 is locked in place in a conventional manner by a mounting bracket 62.

The male pronged plug 34 is mounted in an aperture in the rear wall 58, desirably in the vicinity of, and, preferably, directly in back of, the female socket 60. The male plug likewise is of conventional configuration and construction and consists of a non-electrically conductive body from which there extends rearwardly a pair of parallel prongs 64 adapted to be inserted into a wall outlet 12 where they will engage the female contact blades 16. The plug 34 is held in place, as with the aid of a mounting bracket 66. In this physical embodiment of the invention the lead wire 32 runs directly from one of the blades 36 of the female contact to one of the prongs of the male plug 34.

The unit 52 further includes an assembly 68 which comprises the holding and surge current limiting resistors 28, 26 and the thermally actuated shunting switch 30. This assembly is of compact construction, so that it will easily fit within the compass of the small casing 54 with sufficient surrounding room to provide good convective circulation, so that the air temperature within the casing will not be unusually high, i.e., not tactily uncomfortable, and so that the temperature of the casing itself will be within the limits permitted by the Underwriters' Laboratory.

The assembly 68 is best understood from inspection of FIGS. 4–6 where it will be seen that essentially it constitutes a stack of sundry elements clamped together in face-to-face relationship with a central nut and bolt. All of the elements are apertured in registry, the apertures being of substantially the same size for slidable reception along a ceramic sleeve 70 which provides the core for the assembly.

The foremost element (nearest the front wall of the casing 54) is a ceramic ring 72 (see FIG. 5). The next succeeding element is an electrically conductive, e.g., brass, lug 74 having a connecting arm 76. The next element is a thin soft metal, e.g., lead, washer 78. The next element is the resistor 28a which, like the washer 78, is in the form of a disc. It may be mentioned at this point that because the resistor 28a, like all of the other resistors herein, does not have absolutely plane, i.e. even, external flat surfaces and since, due to the fine unevenness of its flat surfaces, electrical contact and mechanical pressure therewith will be unevenly distributed so that the resistor may be fractured or have non-uniform electrical contact therewith, lead washers are employed to press against such flat surfaces, thereby distributing the stresses and ensuring uniform electrical contact. Similar washers are employed for both faces of all the resistors.

On the other side of the resistor 28a is a lead washer 80. Next in order is a terminal lug 82 which is connected by the wire 44 to a contact 38 of the female socket 60. Following the terminal lug are, successively: a lead washer 84, the resistor 28b, a lead washer 86, and a lug 88 having a connecting arm 90. The two connecting arms 76, 90 are joined electrically by a wire 92. Thus, the two resistors 28a, 28b are connected in parallel between the incoming terminal lug 82 and the lug 88. Since each of the resistors has a resistance value of 3.15 ohms, the joint equivalent resistance is 1.58 ohms. Following the lug 88 are, in order: a lead washer 94, the resistor 26a, a lead washer 96, the resistor 26b, a lead washer 98, and the bimetallic strip 50. Next comes a terminal lug 100 which is connected by the wire 40 to the blade 64 of the male plug 34. Following the terminal lug 100 are, in order: a ceramic washer 102, an electrically conductive rigid metal stationary contact strip 104 carrying the stationary contact 48 in line with the movable contact 46, a lug 106 and a ceramic washer 108. The lug 106 is connected by a wire 110 to the lug 88. Said wire 110, with the aid of the lug 106, connects the thermally actuated switch 30 across the series connected resistors 26a, 26b. The ceramic washers 72 and 108, together with the ceramic sleeve 70, insulate the assembly 68 from its mounting.

The assembly is clamped together by a bolt 112 and a stake nut 114. The head of the bolt is at the front of the assembly (nearest the front wall of the casing 54) and is seated upon a ring 116 which rests against the ceramic ring 72 and has an internal diameter larger than the external diameter of the ceramic sleeve so that when the bolt is tightened in the nut 114, it will place the elements of the socket assembly under compression. The tip of the bolt is threaded into the tapped bore of the stake nut 114 which nut has a flange 118 that is engaged by both the ceramic sleeve 70 and the rearmost face of the ceramic washer 108. The stake nut has said flange 118 flat against the front face of the rear wall 58 and another flange 119 on the rear face, said wall being held under compression between the two flanges. Thereby, when the bolt is tightened against the ring 116 the components of the assembly are locked in place and are at the same time mounted on and project forwardly from the rear wall 58. The bimetallic strip is in good heat conductive relationship with the several resistors.

The nature of the non-linear resistors 26a, 26b, 28a, 28b already has been described in detail hereinabove and it will be apparent that the total equivalent series value of all the resistors when the thermally actuated switch contacts are open is 9.88 (approximately 10) ohms at 25° C. When the limiter is employed in starting up a single-phase motor or group of motors rated at about 12 amperes, the temperature of the resistors rises quickly, for example in about one and one-half to two seconds increasing about 100° C., so that at this time the total equivalent value of all the resistors falls to less than one ohm. The physical design of the bimetallic strip and its heat conductive relationship with the resistors is such that at this time, i.e. after about one and one-half to two seconds with motors rated at about 12 amperes, the contacts will be closed to shunt out the current limiting resistors 26a, 26b and leave in circuit only the holding resistors 28a, 28b which at this time have a value of about 0.15 ohm. The time period mentioned is sufficient to start the motor (or motors) if they are not in blocked rotor condition.

The operation of the unit 52 is believed to be apparent. The plug 34 is inserted in a wall outlet 12 and the plug 22 which leads to the appliance motor is inserted in the female socket 60. The switch 24 is closed. Initially, the limiter 10 inserts a resistance of about ten ohms in the circuit which will prevent a heavy surge current and thus protect the power line. The resistance value of the limiter will decrease steadily and rapidly until the shunting switch contacts close at which time the inserted resistance value will be in the order of one ohm. After the switch contacts close the residual resistance will be in the order of 0.15 ohm. As has been mentioned at some length previously, this continuously variable (as distinguished from stepped) control of the voltage and current not only affords excellent protection for the power line, but gives desirable starting characteristics to the motor.

Moreover, should the motor be blocked because it is under too great a load at the time of starting, the limiter 10 will go through the same cycle and will cut out the current limiting resistor 26. The holding resistor 28 remains in circuit and will be raised to a high temperature, e.g., in the order of 200° C., where it will reach equilibrium because of its greatly lowered resistance, now about 0.01 ohm, and therefore will not be prone to burn-out. However, there is still some residual resistance left which tends to aid in limiting the flow of current through the motor, so that during this overload period after the resistor 26 has been cut out current does not flow completely unimpeded through the line to overheat the same or to activate overload safeguards.

It will be understood that the overload period is not unduly long inasmuch as the temperature of the motor starts to rise and brings into play the thermal cut-out switch which by opening the circuit to the motor deenergizes the limiter 10.

It should be mentioned that the resistance values set forth above and the specific commercial resistors have been given only as by way of example and should not be construed as limitative. It further is to be observed that the reason multiple resistors have been employed for each of the individual resistors 26, 28 is to ensure better uniformity of resistance distribution and to utilize available commercial resistors of the foregoing category. The invention may be carried out in a satisfactory fashion, however, if desired, by single resistors for each of the resistors 26, 28 if commercial resistors of usable resistance values are available.

In FIGS. 7-9 there is illustrated a limiter 120 embodying a modified form of the present invention. This limiter, like the limiter 10, secures its highly desirable effects through the utilization of non-linear resistors, i.e. resistors having a negative temperature coefficient of resistance. However, the limiter 120 is a more compact and less expensive construction, and has other advantages which will become apparent as this description proceeds.

The electric circuit for the limiter 120 is illustrated in FIG. 7 which is a diagram disclosing the various electrical components of said limiter. The limiter includes a male plug 122 and a female socket 124. The plug is designed to be inserted into a wall outlet 126 connected to a source 128 of A.C. power. The female socket 124 is designed to receive a male plug 130 connected through a switch 132 and two-wire cable 134 to a single-phase electric motor 136 that drives a utilization mechanism.

The limiter 120 differs from the limiter 10 in a single basic respect, to wit, it eliminates a holding resistor having a non-linear temperature coefficient of resistance. In lieu thereof, to hold closed the thermally actuated switch it relies upon the heat generated by passage of current through the switch itself, that is to say current passing through the bimetallic strip of the switch and through the switch contacts.

Specifically, the limiter 120 includes a wire 138 which runs directly from one contact of the plug 122 to one blade of the socket 124. The other branch between the plug and the socket is interrupted by a surge current limiting resistor 140 having a non-linear temperature coefficient of resistance. Said resistor is bridged by a thermally actuated shunting switch 142 similar to the switch 30.

It will be apparent that when the limiter is coupled to a power line and in turn has coupled to it a motor, and when the motor switch is closed the current initially flowing through the resistor 140 will be limited by the cold (room temperature) resistance value thereof. As the motor starts up and time passes, actually a matter of about one and one-half to two seconds, the resistor 140 will experience a rise in temperature due to the heat generated by the passage of current therethrough so that a gradually increasing voltage will be applied to the motor and the current drawn from the now protected power line will be roughly constant. The switch 142 and resistor 140 are so dimensioned and in such physical relationship that in a desired period of time, e.g. from one and one-half to two seconds the contacts of the switch 142 will close the shunt to resistor 140. Thereafter full line voltage will be supplied to the motor except for the comparatively small voltage drop through the switch 142. The heat generated in the switch 142 due to the resistance of the bimetallic strip and to the resistance of its contacts is sufficient to maintain the contacts closed so long as the motor current continues to flow.

The physical embodiments of an assembly 144 of the surge current limiting resistor 140 and thermally actuated switch 142 as shown in FIG. 7 are illustrated in FIGS. 8 and 9. It will be appreciated that such construction is very much similar to the construction of the assembly 68 of the limiter 10.

Thus the assembly 144 includes a ceramic sleeve 146 on which there are stacked in order from the front to the rear the following apertured elements: a ceramic ring 147, one leg 148 of a bridging strap 150, a terminal lug 152, a lead washer 154, a disc shaped resistor 140a which is one of several similar resistors jointly constituting the resistor 140, a lead washer 156, a resistor 140b, a lead washer 158, a resistor 140c, a lead washer 160, a bimetallic strip 162 of the thermally actuated switch 142 which strip carries a contact 164 at its free end, a terminal lug 166, a ceramic disc 168, an electrically conductive rigid metal strip 170 having a stationary contact 172 at its free end in registry with and spaced at room temperature from the contact 164, the other leg 174 of the bridging strap 150, and, finally, a ceramic disc 176. Since the three resistors 140a, 140b and 140c are connected in series they act as a single resistor. A satisfactory component for each individual resistor is a General Electric 3W754 "Thermistor." Since each of these has a cold resistance (at 25° C.) of 3.15 ohms, a total equivalent resistance of 9.45 ohms is provided which is large enough to limit the flow of current to the rated capacity of the power line.

The assembly 144 is held together by a bolt 178 passing through the sleeve and having its tip received in a staked nut 180. The head of the bolt is seated on a ring 182 that rests upon the ceramic ring 147 and has an internal diameter in excess of the diameter of the ceramic sleeve 146. Thereby when the bolt is tightened all the components of the assembly will be clamped together. It will be apparent that the three resistors constituting the resistor 140 are connected in series between the two terminal lugs 152, 166 and that the heat sensitive element (the bimetallic strip 162) of the thermally actuated switch is in good heat conductive reltionship therewith and will when closed shunt out said resistor.

The operation of the limiter 120 is identical to that of the limiter 10 except that no holding resistor is employed to maintain the switch contacts closed, this being accomplished, as pointed out above, by the heat generated by internal resistance upon passage of current through the strips 162, 170 and the contacts 164, 172.

The limiter 120 has certain advantages over the limiter 10 and certain disadvantages with respect thereto. One of the principal advantages is that the limiter 110 is less expensive to manufacture and assemble since it has one less non-linear temperature coefficient resistor and at the present time this is the most expensive component of the assembly. Another advantage of the limiter 120 is that during its running operation, i.e., after the thermally actuated switch contacts are closed, it permits the resistor 140 to cool off and this is the component which has the largest heat mass. Therefore in a recycling operation, i.e., in a fresh starting operation, it will be found that the limiter 120 is closer to room temperature than the limiter 10, particularly when the recycling occurs too quickly. It will be recalled that in the limiter 10 the holding resistor 28 remains in circuit as long as the motor is running and only is deactivated when the motor is disconnected. This resistor because of its somewhat appreciable heat mass takes longer to cool than do the parts of the thermally actuated switch 142 the elevated temperature of which in the limiter 120 is employed to hold the switch closed. Another advantage of the limiter 120 is that it can be economically designed to run at a lower temperature than the limiter 10, this in part being due to the provision of the bridging strap 150 which at a very low cost offers a broad area heat dissipating surface. A disadvantage of the limiter 120 is that under blocked rotor conditions it does not provide the residual resistance of the resistor 28.

It thus will be seen that I have provided devices which achieve the several objects of the invention and which are well adapted to meet the conditions of practical use.

As various possible embodiments might be made of the above invention, and as various changes might be made in the embodiments set forth, it is to be understood that all matter herein described or shown in the accompanying drawings is to be interpreted as illustrative and not in a limiting sense.

Having thus described the invention, there is claimed as new and desired to secure by Letters Patent:

1. A power line protecting surge current limiter for single-phase electric motors, said limiter comprising:
   (a) a current limiting resistor having a substantial negative coefficient of resistance and a resistance value at room temperature large enough to limit current flow to at least approximately the rated current capacity of the power line,
   (b) a two-branch circuit adapted to be connected between a power line and a single-phase electric motor,
   (c) said current limiting resistor being series interposed in one of said branches so that it will be heated upon passage of current therethrough,
   (d) neither current branch having therein a resistor with a positive temperature coefficient of resistance,
   (e) a normally open switch connected in shunt with said resistor,
   (f) a heat responsive element controlling the normally open switch and operable to close the switch when heated for a period of time sufficient to start the motor when the motor is not in blocked rotor condition,
   (g) said current limiting resistor being disposed in heat exchange relationship with the heat responsive element so that when potential is supplied by the power line the current limiting resistor first will maximally limit the current supplied to the motor, then the resistance value of the current limiting resistor will decrease due to its temperature increase while the effective resistance of the motor increases, and then the heat generated by the current limiting resistor will operate the heat sensitive element to close the normally open switch and shunt the current limiting resistor after the motor has started, and
   (h) resistance holding means connected in said circuit to generate heat when the switch is closed in order to maintain the switch closed.

2. A power line protecting surge current limiter as set forth in claim 1 wherein the current limiting resistor has a temperature-resistance relationship such that by the time the switch closes the resistance value of said resistor resulting from its increased temperature is reduced to approximately one-tenth of its starting value.

3. A power line protecting surge current limiter as set forth in claim 1 wherein the current limiting resistor has a temperature-resistance relationship such that by the time the switch closes the resistance value of said resistor resulting from its increased temperature is reduced to at least about one-tenth of its starting value.

4. A power line protecting surge current limiter as set forth in claim 1 wherein the resistance holding means is the contact resistance of the normally open switch.

5. A power line protecting surge current limiter as set forth in claim 1 wherein the resistance holding means is the resistance of the heat responsive element and the contact resistance of the normally open switch.

6. A power line protecting surge current limiter as set forth in claim 1 wherein the current limiting resistance is the sole resistor interposed in the one branch of the two-branch circuit when the switch is open.

7. A power line protecting surge current limiter as set forth in claim 1 wherein the resistance holding means is a second resistor having a substantial negative temperature coefficient of resistance, said second resistor being connected in the one branch of the two-branch circuit in series with the first resistor and in series with the normally open switch, said second resistor being disposed in heat exchange relationship with the heat responsive element, whereby when the motor is in a blocked rotor condition the second resistor will protect itself by lowering its resistance so as to reach an equilibrium temperature below burn-out of said second resistor, and whereby the residual resistance value of the second resistor will remain in said one branch to aid in protecting the power line.

8. A power line protecting surge current limiter as set forth in claim 1 wherein a casing is provided in which the current limiting resistor, the two-branch circuit, the normally open switch and the heat responsive element are located, said casing including ventilating openings, said casing having a rear wall and at least one other wall, a male plug carried by the rear wall, a female socket carried by the other wall, one branch of the circuit running directly from one of the prongs of the male plug to one of the blades of the female socket, the other branch of the circuit running from the other prong to the other blade having said resistor and normally open switch therein.

9. A power line protecting surge current limiter as set forth in claim 1 wherein the current limiting resistor constitutes an apertured disc which is part of an assembly including a sleeve of electrically non-conductive material which extends through the disc, a bimetallic strip on said sleeve adjacent the resistor disc, a disc of electrically non-conductive material on said sleeve with the bimetallic strip located between said disc of electrically non-conductive material and said resistor disc, a second strip on said sleeve on the other side of said disc of electrically non-conductive material, said strips being in alignment and carrying facing contacts, said strips and contacts constituting the normally open switch, another disc of electrically non-conductive material on the other side of the resistor disc, a bolt extending through the sleeve, and a nut engaging said bolt and with said bolt holding in compression the elements on the sleeve.

10. A power line protecting surge current limiter for single-phase electric motors, said limiter comprising:
 (a) a current limiting resistor having a substantial negative coefficient of resistance and a resistance value at room temperature large enough to limit current flow to approximately the rated current capacity of the power line,
 (b) a two-branch circuit adapted to be connected between a power line and a single-phase electric motor,
 (c) said current limiting resistor being series interposed in one of said branches so that it will be heated upon passage of current therethrough,
 (d) neither current branch having therein a resistor with a positive temperature coefficient to resistance,
 (e) a normally open switch connected in shunt with at least a major portion of said resistor,
 (f) a heat responsive element controlling the normally open switch and operable to close the switch when heated for a period of time sufficient to start the motor when the motor is not in blocked rotor condition,
 (g) said current limiting resistor being disposed in heat exchange relationship with the heat responsive element so that when potential is supplied by the power line the current limiting resistor first will maximally limit the current supplied to the motor, then the resistance value of the current limiting resistor will decrease due to its temperature increase while the effective resistance of the motor increases, and then the heat generated by the current limiting resistor will operate the heat sensitive element to close the normally open switch and shunt the current limiting resistor after the motor has started, and
 (h) resistance holding means connected in said circuit to generate heat when the switch is closed in order to maintain the switch closed.

11. A system comprising:
 (a) a power line,
 (b) a single-phase electric motor, and
 (c) a surge current limiter for protecting said power line from the motor starting current,
  said surge current limiter comprising:
   (i) a current limiting resistor having a substantial negative coefficient of resistance and a resistance value at room temperature large enough to limit current flow to approximately the rated current capacity of the power line;
   (ii) a two-branch circuit connected between the power line and the single-phase electric motor;
   (iii) said current limiting resistor being series interposed in one of said branches so that it will be heated upon passage of current therethrough;
   (iv) neither branch having therein a resistor with a positive coefficient of resistance;
   (v) a normally open switch connected in shunt with at least a major portion of said resistor;
   (vi) a heat responsive element controlling the normally open switch and operable to close the switch when heated for a period of time sufficient to start the motor when the motor is not in blocked rotor condition;
   (vii) said current limiting resistor being disposed in heat exchange relationship with the heat responsive element so that when potential is supplied by the power line the current limiting resistor first will maximally limit the current supplied to the motor, then the resistance value of the current limiting resistor will decrease due to its temperature increase while the effective resistance of the motor increases, and then the heat generated by the current limiting resistor will operate the heat sensitive element to close the normally open switch and shunt the current limiting resistor after the motor has started, and
   (viii) resistance holding means connected in said circuit to generate heat when the switch is closed in order to maintain the switch closed.

References Cited by the Examiner

UNITED STATES PATENTS

| 806,758 | 12/1905 | Steinmetz | 318—399 X |
| 809,878 | 1/1906 | Wilson | 318—399 X |
| 1,847,865 | 3/1932 | Cornell | 317—41 X |
| 2,057,383 | 10/1936 | Kroger. | |
| 3,017,564 | 1/1962 | Barney | 317—41.1 X |

MILTON O. HIRSHFIELD, *Primary Examiner.*

SAMUEL BERNSTEIN, *Examiner.*

R. V. LUPO, *Assistant Examiner.*